Dec. 11, 1956 F. A. MORRIS 2,773,947
TESTING ARRANGEMENT FOR ELECTRONIC TELEPHONE SYSTEM
Filed March 16, 1955
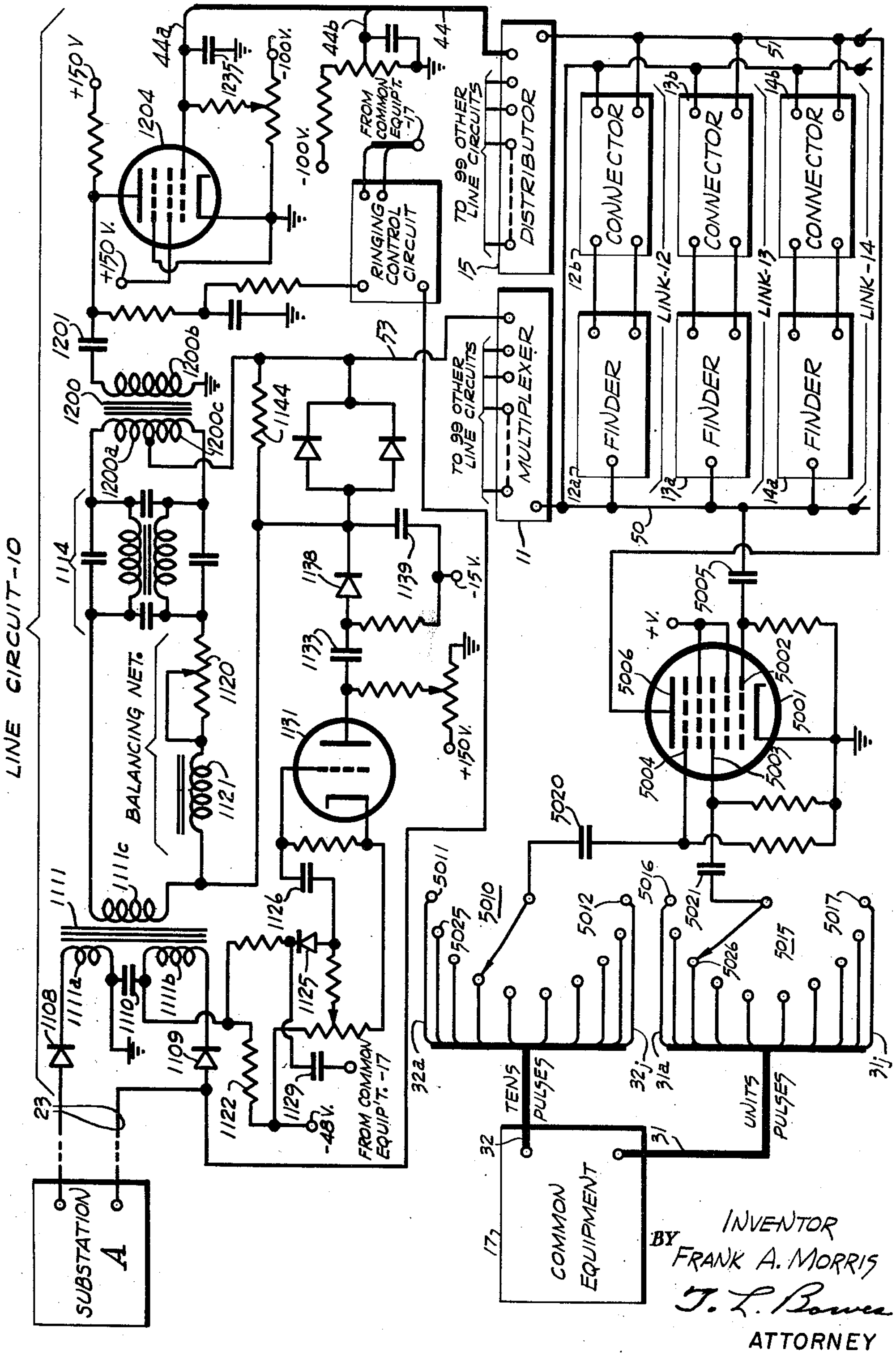
INVENTOR
BY FRANK A. MORRIS
T. L. Bowes
ATTORNEY United States Patent Office 2,773,947

Patented Dec. 11, 1956

2,773,947

TESTING ARRANGEMENT FOR ELECTRONIC TELEPHONE SYSTEM

Frank A. Morris, Rochester, N. Y., assignor, by mesne assignments, to General Dynamics Corporation, a corporation of Delaware Application March 16, 1955, Serial No. 494,623

15 Claims. (Cl. 179—175.2)

The present invention relates to electronic telephone systems, and, more particularly, to a testing arrangement for an electronic telephone system wherein adjustment of the balancing networks individually associated with the lines of the system may be readily checked without requiring special line circuit facilities and without involving the call establishing linkage of the system. Specifically, the present invention relates to a balance testing arrangement for an electronic telephone system of the type described and claimed in a copending application of Robert B. Trousdale and Frank A. Morris, Serial No. 134,974, filed December 24, 1949, and assigned to the same assignee as the present invention.

In the electronic telephone system disclosed in the above identified copending application the line circuits which are individually associated with the lines of the system are provided with a hybrid coil and balancing network arrangement which may be adjusted to permit speech transmission in both directions between the calling and called lines while preventing cross talk between the forward and return signal paths and regeneration oscillation which is sometimes known as singing. Since a complete connection involves two line circuits each equipped with a hybrid coil arrangement, the adjustment of one line circuit affects the other line circuit and it is possible to have one line circuit completely unbalanced without producing singing due to the fact that the other line circuit is perfectly balanced. It is therefore, difficult to balance individual line circuits while using the normal linkage of the system due to the above described interdependence of both line circuits involved in a connection.

In conventional telephone repeaters wherein hybrid coil arrangements are employed, it is customary to unbalance one side of the repeater completely, as by opening or short circuiting the line terminals at the side opposite to the one under test, so that each balancing network may be adjusted independently. However, in a telephone exchange this repeater alignment procedure would require calling a special number equipped with a dummy and unbalanced line circuit.

It is, therefore, an object of the present invention to provide a new and improved testing arrangement for determining the balance condition of individual line circuits of an automatic telephone system.

It is another object of the present invention to provide a new and improved testing arrangement for determining the balance condition of individual line circuits of an automatic telephone system without completing a connection to another line circuit of the system.

It is a further object of the present invention to provide a new and improved balance testing arrangement for an electronic telephone system of the pulse multiplex type.

It is a still further object of the present invention to provide a new and improved balance testing arrangement for an electronic telephone system wherein each line circuit may be balanced from the central office without requiring special unbalanced line circuits.

Briefly, in accordance with one aspect of the invention a pulse gating circuit is provided at the central office which is controlled by suitable gating pulses to select multiplexer pulses which occur in any one of the assigned time positions of the system. The selected multiplexer pulses are then routed directly back to the calling line circuit by way of the pulse distributor so that all signals which are transmitted over the calling line are fed back to the calling line circuit independently of the call establishing linkage of the system. By thus returning all of the transmitted signals to the receiving terminals of the same line circuit the same result is obtained as though a complete connection were established to a completely unbalanced line circuit so that the balancing network in the line circuit under test may then be adjusted to eliminate singing and without interaction from any other line circuit of the system.

The invention, both as to its organization and method of operation, together with further objects and advantages thereof, will best be understood by reference to the following specification taken in connection with the accompanying drawings, in which the single figure of the drawing is a schematic diagram, partly in block diagram form, of a telephone system embodying the features of the present invention.

Referring now to the drawing, the present invention is therein illustrated in conjunction with an electronic telephone system which includes a line circuit 10, which is shown in detail in the drawing and is connected by way of the line 23 to the substation A, a multiplexer 11, a plurality of impulse responsive line selecting links 12, 13 and 14, a distributor 15 and common equipment 17. The units 10 to 15 inclusive and 17 are all substantially identical to the corresponding units having the same reference numerals in the system disclosed in the above identified copending application and reference may be had to this copending application for a complete and detailed description of these system components. However, for the purposes of the present invention, it may be stated that the line circuit 10 is employed to terminate the two-conductor line 23 and performs the functions of repeating intelligence or control signals from its associated substation A to one of the gate circuits in the multiplexer 11, repeating intelligence signals derived from the corresponding gate circuit in the distributor 15 to its associated substation, and of responding to ring start signals derived from one of the connectors 12*b*, 13*b* or 14*b* by way of the distributor 15 to transmit ringing current to the associated substation on a call incoming thereto.

In the illustrated 100 line system, each line or substation of the system is assigned a particular pulse time position in each of repetitive pulse frames each comprising 100 pulse time positions. A decimal system of multiplexing is employed which entails arbitrary division of the lines of the system into subgroups so that 100 lines of the system are divided into ten subgroups of ten lines each and tens multiplexing or gating pulses are developed by the common equipment 17 at the rate of ten pulses for each pulse frame. Units pulses are also developed in the common equipment 17 in each pulse time position and the units and tens pulses are employed to control both the multiplexer 11 and the distributor 15. The multiplexer 11 inludes 100 gate circuits, one for each line of the system, and performs the functions of sampling the intelligence and control signals derived from the 100 line circuits of the system only in the pulse time positions of each pulse frame individually assigned to the lines served by these line circuits, and of modulating the sampled intelligence or control signals on multiplexer signal pulses which are transmitted over the common output conductor 50 to the finders and connectors of the links 12, 13 and 14.

The finders of the various links perform the functions of determining when the links shall be taken into use, determining the calling line with which the link is to be associated in handling a call and determining the particular pulse time position of successive pulse frames which is assigned to the calling line and during which signal bearing multiplexer pulses derived from the multiplexer 11 shall be effective to produce a response in the finder and in its associated connector.

Each of the connectors performs a number of functions necessary to set up a telephonic connection to a called one of the lines and includes facilities for transmitting a dial tone signal to the calling subscriber to inform him that dialing may be initiated, responding to dial impulses by selecting the called line time position and transmitting modulated connector signal pulses to the distributor 15 over the common input conductor 51 thereof in the time positions assigned to both the calling and called lines.

The distributor 15 includes 100 gate circuits, one for each line of the system, which are controlled by the tens and units pulses developed in the common equipment 17 so as to separate pulse signals appearing on the common input conductor 51 thereof and route these signals to the corresponding line circuits associated with the calling and called lines of the system. Thus, the gate circuit in the distributor 15 which is assigned to the line 23, is opened during the time position assigned to the line 23 so that signals may be transmitted over the conductor 44*a* to the line circuit 10 wherein they are converted into corresponding speech signals and transmitted over the line 23.

Considering now the portions of the system described above which involve the present invention, there is provided a balance test circuit 5000 which includes a gate tube 5001 having three control grids 5002, 5003 and 5004, each of which has a substantial transconductance when operated at substantially the cathode potential of the tube 5001. The multiplexer pulses which are produced on the multiplexer output conductor 50 and are modulated in accordance with signals transmitted over calling and called lines of the system, are coupled through the condenser 5005 to the first control grid 5002 of the tube 5001. The anode 5006 of the tube 5001 is directly connected to the input conductor 51 of the distributor 15, it being understood that a suitable anode load impedance and anode potential source for the tube 5001 are connected to the conductor 51 in the distributor 15, as described in detail in the above identified copending application.

In order to select those multiplexer pulses which appear on the conductor 50 in a particular time position, the positive tens pulses which are developed in the common equipment 17 on the ten individual conductors of the cable 32 are supplied to a tens selector switch indicated generally at 5010. Thus, the tens pulses appearing upon the conductor 32*a* are supplied to the first contact 5011 of the switch 5010 and the tenth tens pulses appearing on the conductor 32*j* are supplied to the tenth contact 5012 of the switch 5010. In a similar manner, the positive units pulses which are developed by the common equipment 17 on the cable 31 are supplied to a units selector switch 5015 in the balance test circuit 5000. Thus, the first units pulses which appear on the conductor 31*a* are supplied to the first contact 5016 of the switch 5015 and the tenth units pulses which appear on the conductor 32*j* are supplied to the tenth contact 5017, it being understood that the intermediate contacts of both the switches 5010 and 5015 are supplied with the appropriate tens and units pulse conductors. The movable arm of the selector switch 5010 is connected through the condenser 5020 to the third control grid 5004 of the gate tube 5001 and the movable arm of the switch 5015 is connected through the condenser 5021 to the second control grid 5003 of the gate tube 5001. Since each of the control grids of the gate tube 5001 are A. C. biased beyond cutoff except during periods when positive pulses are impressed upon these control grids, the tube 5001 conducts only during periods when all of these pulses coincide. Accordingly, by adjustment of the selector switches 5010 and 5015 any one of the time positions of the system may be selected by combining certain ones of the tens and units pulses on the cables 32 and 31.

If it is desired to establish a time position corresponding to the line 23, the movable arm of the selector switch 5010 is connected to the second contact 5025 thereof and the movable arm of the selector switch 5015 is connected to the third contact 5026 thereof. These tens and units pulses will combine to control the gate tube 5001 so that it passes only those multiplexer pulses appearing on the conductor 50 which occur in the time position assigned to the line 23 even tough multiplexer pulses corresponding to many other lines of the system may also be present on the conductor 50. The multiplexer pulses which are selected by the gate tube 5001 and which are modulated in amplitude in accordance with signals transmitted over the line 23, are coupled directly from the anode of the gate tube 5001 to the common input conductor 51 of the distributor 15 so that these selected multiplexer pulses are connected to the distributor 15 independently of the finder-connector links 12, 13 and 14 of the system which are normally employed to set up telephonic connections. In the distributor 15 the selected multiplexer pulses are separated from the other signals appearing on the conductor 51, in the gate circuit of the distributor 15 which is assigned to the line 23, and the separated signal modulated pulses are transmitted over the conductor 44*a* of the cable 44 to the input circuit of the amplifier tube 1204 wherein the original signals are reconstructed by means of the integrating condenser 1235 which is connected between the conductor 44*a* and ground. The amplified reconstructed signals which are developed at the anode of the tube 1204 are coupled through the condenser 1201 to the primary winding 1200*b* of a coupling transformer 1200 which has a pair of identical secondary windings 1200*a* and 1200*c*. The return speech signals which are developed across the windings 1200*a* and 1200*b* are then transmitted through the filter indicated generally at 1114 to the balancing network which includes the coil 1121 and the variable resistor 1120, and the secondary winding 1111*c* of the line transformer 1111. Accordingly, one-half of the return speech signals are developed across the transformer winding 1111*c* and are coupled into the primary windings 1111*a* and 1111*b* of the transformer 1111 so that these speech signals are transmitted over the line 23 to the substation A.

Considering now the manner in which speech signals are transmitted in the forward direction from the substation A over the line 23 and through the line circuit 10 to the multiplexer 11, when the substation A comes off-hook the conductors of the line 23 are closed so that a flow of current is provided from the 48 volt supply through the resistor 1122, the winding 1111*b*, the rectifiers 1109 and 1108 and the winding 1111*a* to ground. When a voltage drop is produced across the resistor 1122 the rectifier 1125 is rendered conductive so that a 100 kilocycle supervisory carrier signal, which is developed in the common equipment 17 in a manner described in detail in the above identified copending application, is coupled through the condenser 1129, the rectifier 1125 and the condenser 1126 to the control grid of the limiting amplifier tube 1131. The supervisory carrier signal which is thus supplied to the control grid of the tube 1131 is amplified therein and is coupled through the condenser 1133 to the rectifier 1138 so as to charge the condenser 1139 positively. The minus 15 volt supply and the voltage developed across the condenser 1139 are employed as a bias source for the control grid of the gate tube in the multiplexer 11 corresponding to the line 23. Normally, the voltage appearing on the conductor 53 is minus 15 volts since the condenser 1139 is normally not charged through the rectifier 1138. However, when a call is initiated on the line 23 in the manner described above the positive voltage developed across the condenser 1139 increases the potential on the conductor 1153 in the positive sense so as to enable the corresponding gate tube in the multiplexer 11 to conduct and develop relatively narrow multiplexer pulses which are eventually produced on the output conductor 50 of the multiplexer 11 in the time position assigned to the line 23. Speech signals which are transmitted from the substation A over the line 23 are coupled through the transformer 1111 to the secondary winding 1111c thereof and are produced across the resistor 1144 so that these speech signals modulate the suppressor grid voltage of the corresponding gate tube in the multiplexer 11. As a result, the multiplexer pulses which are produced on the conductor 50 are modulated in amplitude in accordance with the speech signals developed across the resistor 1144.

Considering now the manner in which the balance test circuit 5000 is employed to adjust a line circuit for perfect balance independently of the call establishing linkage of the system and without completing a connection to another line of the system, it will be assumed that the line circuit 10 is to be adjusted. The receiver at the remote substation A is then taken off the switch hook so that the conductors of the line 23 are closed and multiplexer pulses are developed on the output conductor 50 of the multiplexer 11 in the time position assigned to the line 23. The selector switches 5010 and 5015 in the test circuit 5000 are then connected to the contacts 5025 and 5026, respectively, so as to control the gate tube 5001 to conduct only during the time position assigned to the line 23. Accordingly, the multiplexer pulses which appear on the conductor 50 in the time position assigned to the line 23 are coupled through the gate tube 5001 substantially without change, although they are inverted in polarity in transmission through the tube 5001, and are impressed upon the input conductor 51 of the distributor 15. In the distributor 15 the gate circuit corresponding to the line 23 is opened in synchronism with the multiplexer pulses thus appearing on the conductor 51 so that these multiplexer pulses are coupled over the conductor 44a, are demodulated due to the integration of the condenser 1235, are amplified in the tube 1204 and are coupled through the transformer 1200 to the primary windings 1200a and 1200c thereof. If the balancing network, which includes the coil 1121 and the resistor 1120, does not have substantially the same impedance as the secondary winding 1111c of the transformer 1111, it will be evident that a certain portion of the received signals will be developed across the resistor 1144 in the forward signal transmission channel. Accordingly, if the balancing network is not adjusted properly, a portion of the return signals will be fed into the forward signal channel, and will be transmitted through the multiplexer 11, the gate tube 5001 and the distributor 15 back to the return signal channel with the result that oscillation or singing will result. The balancing network can then be readily adjusted by variation of the resistor 1120 until the above described regeneration or singing ceases. Since the line circuit 10 is the only line circuit involved in the test procedure, the proper balance of the line circuit 10 without interaction with other line circuits of the system is assured. In this connection, it will be undestood that any suitable means may be employed to determine when the balancing network is correctly adjusted, i. e., determine the absence of regeneration, as will be readily understood by those skilled in the art.

If it is desired to test another line circuit of the system, the substation associated therewith is put off-hook and the selector switches 5010 and 5015 are adjusted to control the gate tube 5001 so that this tube accepts only multiplexer pulses which appear in the time position corresponding to the selected line. The balancing network of the associated line circuit is then adjusted in the manner described above without requiring an artificial unbalanced line circuit and without utilizing with the call establishing linkage of the system. In this connection, it will be understood that while the tens and units gating functions in the test circuit 5000 have been illustrated as being combined in a single gate tube, these function may be independently performed in separate gate tubes so as to segregate the tens and units gating function, provided the polarity relationships described above are preserved, as will be readily understood by those skilled in the art.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. In an automatic telephone system, a plurality of lines having individually assigned thereto different time positions in repetitive time position frames, a line circuit associated with each of said lines, a hybrid coil and balancing network arrangement included in each line circuit, multiplexer means for producing pulses on a common output conductor in the time positions individually assigned to said lines as said lines are taken into use, distributor means for distributing signals to said line circuits in accordance with the time positions assigned to said lines, means including a plurality of impulse responsive links connected between said multiplexing means and said distributing means for setting up two-way communication connections between calling and called ones of said lines, and balance testing means for connecting said multiplexer pulses to said distributor means independently of said links.

2. In an automatic telephone system, a plurality of lines having individually assigned thereto different time positions in repetitive time position frames, a line circuit associated with each of said lines, a hybrid coil and balancing network arrangement included in each line circuit, multiplexer means for producing pulses on a common output conductor in the time positions individually assigned to said lines as said lines are taken into use, distributor means for distributing signals to said line circuits in accordance with the time positions assigned to said lines, means including a plurality of impulse responsive links connected between said multiplexing means and said distributing means for setting up two-way communication connections between calling and called ones of said lines, and means independent of said connection establishing means for connecting multiplexer pulses which occur in the time position assigned to a selected one of said lines to said distributor means.

3. In an automatic telephone system, a plurality of lines having individually assigned thereto different time positions in repetitive time position frames, a line circuit associated with each of said lines, a hybrid coil and balancing network arrangement included in each line circuit, multiplexer means for producing pulses on a common output conductor in the time positions individually assigned to said lines as said lines are taken into use, distributor means for distributing signals to said line circuits in accordance with the time positions assigned to said lines, means including a plurality of impulse responsive links connected between said multiplexing means and said distributing means for setting up two-way communication connections between calling and called ones of said lines, pulse gating means common to said lines and said links for selecting multiplexer pulses which occur in the time position assigned to a selected one of said lines, and means connecting said selected multiplexer pulses to the input of said distributor means independently of said connection establishing means.

4. In an automatic telephone system, a plurality of lines having individually assigned thereto different time positions in repetitive time position frames, a line circuit associated with each of said lines, a hybrid coil and balancing network arrangement included in each line circuit, multiplexer means for producing pulses on a common output conductor in the time positions individually assigned to said lines as said lines are taken into use, distributor means for distributing signals to said line circuits in accordance with the time positions assigned to said lines, means including a plurality of impulse responsive links connected between said multiplexing means and said distributing means for setting up two-way communication connections between calling and called ones of said lines, a normally closed pulse gating circuit common to said lines, means connecting the output of said multiplexer means to the input of said pulse gating circuit, means for opening said pulse gating circuit during the time position assigned to a manually selected one of said lines, and means connecting the output of said pulse gating circuit to the input of said distributor means.

5. In an automatic telephone system, a plurality of lines having individually assigned thereto different time positions in repetitive time position frames, a line circuit associated with each of said lines, means responsive to the initiation of a call on one of said lines for developing pulses in the time position assigned to said calling line, and means for feeding back said developed pulses to the line circuit associated with said calling line.

6. In an automatic telephone system, a plurality of lines having individually assigned thereto different time positions in repetitive time position frames, a line circuit associated with each of said lines, a signal sampling multiplexer and a signal distributor, each of said line circuits including a first channel for transmitting signals from the line associated therewith to said multiplexer and a second channel for transmitting signals from said distributor to the line associated therewith, and means for feeding signal samples developed by said multiplexer in the time position assigned to a calling one of said lines to said distributor in the same position.

7. In an automatic telephone system, a plurality of lines having individually assigned thereto different time positions in repetitive time position frames, a line circuit associated with each of said lines, time position responsive means for establishing a telephone connection between a calling one of said lines and any called one of said lines, and balance testing means responsive to an in-use condition on one of said lines for feeding signals which originate on said one line back to the line circuit associated with said one line and independently of said connection establishing means.

8. In an automatic telephone system, a plurality of lines having individually assigned thereto different time positions in repetitive time position frames, a line circuit associated with each of said lines, time position responsive means for establishing a telephone connection between a calling one of said lines and any called one of said lines, each of said line circuits having a first speech transmission channel for transmitting speech signals from the line associated therewith to said connecting means and a second speech transmission channel for transmitting speech signals from said connecting means to the line associated therewith, and means independent of said connecting means for connecting the output of said first channel to the input of said second channel in any selected one of said line circuits.

9. In an automatic telephone system, a plurality of lines having individually assigned thereto different time positions in repetitive time position frames, a line circuit associated with each of said lines, time position responsive means for establishing a telephone connection between a calling one of said lines and any called one of said lines, each of said line circuits having a first speech transmission channel for transmitting speech signals from the line associated therewith to said connecting means and a second speech transmission channel for transmitting speech signals from said connecting means to the line associated therewith, and balance testing means bypassing said connection establishing means and connecting speech signals from the output of said first channel to the input of said second channel in any selected one of said line circuits.

10. In an automatic telephone system, a plurality of lines having individually assigned thereto different time positions in repetitive time position frames, a line circuit associated with each of said lines, time position responsive means for establishing a telephone connection between a calling one of said lines and any called one of said lines, each of said line circuits having a first speech transmission channel for transmitting speech signals from the line associated therewith to said connecting means and a second speech transmission channel for transmitting speech signals from said connecting means to the line associated therewith, a balancing network in each of said line circuits for preventing signal across feed between said channels, and means independent of said connection establishing means for connecting speech signals from the output of said first channel to the input of said second channel in any selected one of said line circuits, whereby said balancing networks may be individually adjusted independently of said connection establishing means.

11. In an automatic telephone system, a plurality of lines having individually assigned thereto different time positions in repetitive time position frames, a line circuit associated with each of said lines, multiplexer means having a common signal sample output channel and operative to sample signals produced on said lines in the time positions individually assigned to said lines and to transmit the signal samples over said common output channel in said time positions, distributing means having a common input channel and operative to distribute signals to said line circuits in accordance with the time positions individually assigned to the associated lines, a plurality of impulse responsive links connected between said output and input channels for completing connections between calling and called ones of said lines, each of said line circuits having a first speech transmission channel for transmitting speech signals from the line associated therewith to said multiplexer means and a second speech transmission channel for transmitting speech signals from the output of said distributor means to the line associated therewith, means independent of said lines for selecting signal samples on said output channel in a predetermined one of said time positions, and means for impressing said selected signal samples on said distributor input channel, thereby effectively to connect said first and second speech transmission channels together independently of said links.

12. In an automatic telephone system, a plurality of lines having individually assigned thereto different time positions in repetitive time position frames, a line circuit associated with each of said lines, multiplexer means having a common signal sample output channel and operative to sample signals produced on said lines in the time positions individually assigned to said lines and to transmit the signal samples over said common output channel in said time positions, distributing means having a common input channel and operative to distribute signals to said line circuits in accordance with the time positions individually assigned to the associated lines, a plurality of impulse responsive links connected between said output and input channels for completing connections between calling and called ones of said lines, each of said line circuits having a first speech transmission channel for transmitting speech signals from the line associated therewith to said multiplexer means and a second speech transmission channel for transmitting speech signals from the output of said distributor means to the line associated therewith, means independent of said lines for developing gating pulses in each of said time position, means controlled by said gating pulses for selecting signal samples on said output channel in a preselected one of said time positions, and means for impressing said selected signal samples on said distributor input channel, thereby effectively to connect said first and second speech transmission channels together independently of said links.

13. In an automatic telephone system, a plurality of lines having individually assigned thereto different time positions in repetitive time position frames, a line circuit associated with each of said lines, multiplexer means having a common signal sample output channel and operative to sample signals produced on said lines in the time positions individually assigned to said lines and to transmit the signal samples over said common output channel in said time positions, distributing means having a common input channel and operative to distribute signals to said line circuits in accordance with the time positions individually assigned to the associated lines, a plurality of impulse responsive links connected between said output and input channels for completing connections between calling and called ones of said lines, each of said line circuits having a first speech transmission channel for transmitting speech signals from the line associated therewith to said multiplexer means and a second transmission channel for transmitting speech signals from the output of said distributor means to the line associated therewith, means for developing gating pulses in each of said time positions, manually actuable selector switch means for selecting a predeterminal one of said gating pulses, normally closed pulse gating means, means for connecting said output channel to the input of said pulse gating means, means for opening said pulse gating means under the control of said selected gating pulse, and means connecting the output of said pulse gating means to said input channel.

14. In an automatic telephone system, a plurality of lines having individually assigned thereto different time positions in repetitive time position frames, a line circuit associated with each of said lines, multiplexer means having a common signal sample output channel and operative to sample signals produced on said lines in the time positions individually assigned to said lines and to transmit the signal samples over said common output channel in said time positions, distributor means having a common input channel and operative to distribute signals to said line circuits in accordance with the time positions individually assigned to the associated lines, a plurality of impulse responsive links connected between said output and input channels for completing connections between calling and called ones of said lines, each of said line circuits having a first speech transmission channel for transmitting speech signals from the line associated therewith to said multiplexer means and a second speech transmission channel for transmitting speech signals from the output of said distributor means to the line associated therewith, means for developing gating pulses in each of said time positions, selector switch means for selecting a predeterminal one of said gating pulses, a gate tube common to said lines and having a plurality of input electrodes and an output electrode, means for connecting said multiplexer output channel to one of said input electrodes, means for connecting said selected gating pulses to another of said input electrodes, and means connecting said output electrode to said distributor input channel.

15. In an automatic telephone system, a plurality of lines having individually assigned thereto different time positions in repetitive time position frames, a line circuit associated with each of said lines, multiplexer means having a common signal sample output channel and operative to sample signals produced on said lines in the time positions individually assigned to said lines and to transmit the signal samples over said common output channel in said time positions, distributing means having a common input channel and operative to distribute signals to said line circuits in accordance with the time positions individually assigned to the associated lines, a plurality of impulse responsive links connected between said output and input channels for completing connections between calling and called ones of said lines, each of said line circuits having a first speech transmission channel for transmitting speech signals from the line associated therewith to said multiplexer means and a second speech transmission channel for transmitting speech signals from the output of said distributor means to the line associated therewith, means for developing gating pulses in each of said time positions of substantially greater width than said signal samples, selector switch means for selecting a predeterminal one of said gating pulses, a gate tube common to said lines and having a plurality of input electrodes and an output electrode, means for connecting said multiplexer output channel to one of said input electrodes, means for connecting said selected gating pulses to another of said input electrodes, and means connecting said output electrode to said distributor input channel.

No references cited.